Sept. 1, 1931.  J. H. McEVOY, JR  1,821,659
WELL STRAINER
Filed Aug. 1, 1930

Joseph H. McEvoy Jr. Inventor
By Jesse R. Stone
Attorney

Patented Sept. 1, 1931

1,821,659

UNITED STATES PATENT OFFICE

JOSEPH HENRY McEVOY, JR., OF HOUSTON, TEXAS

WELL STRAINER

Application filed August 1, 1930. Serial No. 472,463.

My invention relates to well strainers for use particularly in deep wells for filtering impurities from oil, water or other fluid coming into the pipe.

It is an object of the invention to provide a well strainer which is particularly strong and durable in its construction and economical to manufacture. It is desired to form a straining member which may be secured in position upon a perforated pipe in such manner that the material coming into the well will be properly filtered.

It is also an object to provide a form of screen in which the filtering member may be most conveniently formed in an accurate manner and at a lessened cost.

Referring to the drawings herewith, wherein the application of my invention has been shown, Fig. 1 is a side elevation of a strainer pipe having my invention applied thereon, part of the view being in longitudinal section, for greater clearness.

Like numerals of reference designate like parts in all the views.

Figure 2:
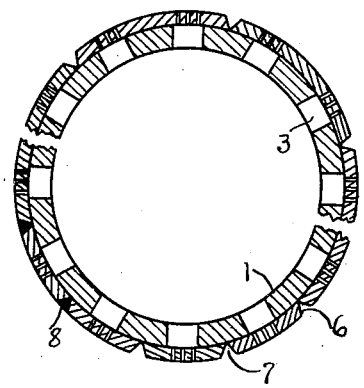
Fig. 2 is a transverse section through the device disclosed in Fig. 1.

The pipe 1 upon which I have shown my invention is illustrative of an ordinary perforated pipe threaded at the end, as shown at 2, and having a series of spaced openings 3 cut therein. These openings are usually cut with a boring tool and are circular in shape, and are thus shown in the drawings, although the shape of the hole is immaterial in the use of my invention, as will clearly appear.

Figure 1:
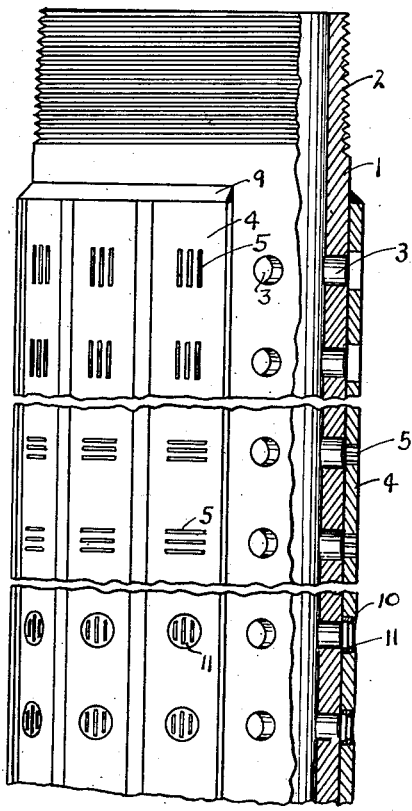

I contemplate forming the straining openings for the pipe on separate plates attached to the pipe around its periphery. These plates, indicated at 4 in the drawings, may extend the entire length of the strainer pipe, or rather from the one threaded end to the other about as shown in Fig. 1.

The openings 3 in the pipe are normally made in rows extending longitudinally of the pipe and spaced equal distances apart. The plates 4 will be formed with strainer openings 5 therein to register with the openings in the pipe. The said openings may be slots extending longitudinally of the pipe, as shown at the upper end of Fig. 1, or transversely of the pipe, as shown in the intermediate section of Fig. 1, or it may be desirable to place removable buttons in the plate 4, as indicated in the lower section of Fig. 1.

The plates 4 may be made of any desired material, and it will be possible to make them of hardened steel curved slightly in transverse section to conform to the curvature of the pipe and of sufficient width to cover one or more of the longitudinal rows of openings in the pipe. In Fig. 1 I have shown the plates as each covering one longitudinal row of the pipe openings 3. The sides of the adjacent plates are beveled slightly, as shown at 6, so that when the adjacent plates are in position a V-shaped groove 7 will be formed between the meeting edges of the plates. In the groove thus formed I contemplate depositing by a blowtorch, or other equivalent means, a bond of welded metal 8, thus binding each plate to the adjacent plate in such manner that it becomes in effect one continuous sleeve about the pipe. I also contemplate placing a bonding strip 9 of welded material at the ends of the plates, as indicated particularly in Fig. 1, said bonding strip being tapered inwardly to form a beveled shoulder at the ends of the plates.

Figure 3:
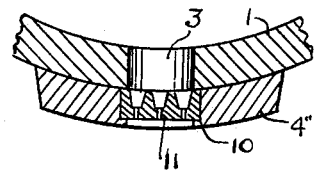
Fig. 3 is an enlarged detail showing the use of a strainer button with my invention.
Figure 4:
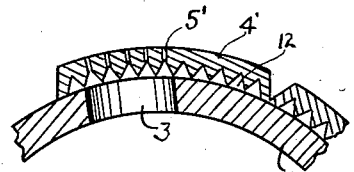
Fig. 4 is a broken detail in transverse section showing the use of strainer plates.
Figure 5:
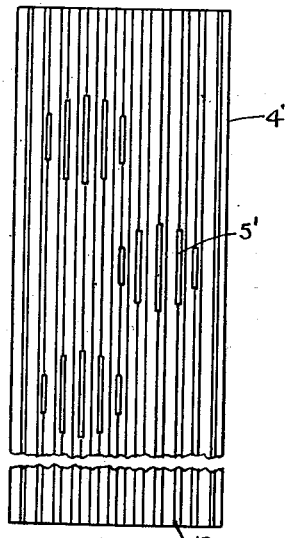
Fig. 5 is a lower plan view of one of the strainer plates.

As the plates are separate, it will be possible to cut the straining slots 5 within the plates by any convenient means, such as a milling cutter, blowtorch or the slots may even be purched or cast therein during the formation of the plate. The process of cutting these slots will be a simple one, however, when the plates are off the pipe, as will be obvious. In case it is desired to use the button form of screening openings, the plates 4 may be cut with circular openings which are reamed out so as to form a shoulder 10 toward the outer end of the opening, as indicated in Figs. 1 and 3. The screening button 11 may then be forced into the opening, the outer face contacting with the shoulder 10, the opening in the plate being of larger diameter than the opening 3 in the pipe. The button will be secured firmly in position against removal at all times when the plate has been secured to the pipe, as indicated in Fig. 3.

Where the slotted openings in the plates are cut longitudinally of the plate, the construction indicated in Figs. 4 and 5 may be employed and the plate 4", indicated in these views, is curved to conform to the outline of the pipe, as in the previous embodiments, and the inner face of the plate is formed with longitudinally cut grooves or corrugations 12. Where this plate is used, slots 5' will be cut in the plate to register with the lower troughs of the grooves, as indicated in Fig. 4. The straining openings will, therefore, have parallel sides for a short distance, the slots then widening out toward the center of the pipe in a manner to correspond with straining openings now sometimes employed. The plate 4' may be wide enough to cover two rows of openings in the pipe, and if desired, they may be formed in staggered relation to each other, as indicated in Fig. 5, the openings in the pipe corresponding to and registering with the slotted openings in the plate. When this type of plate is used, the welded strip 9 at the ends of the plates will serve to close the grooves 12 in the plates, and thus prevent the passage of liquid through the openings at that point.

While I have shown and described the plates as being secured in position by welding, it is obvious that they may be otherwise secured against removal, and I do not wish to be confined to the exact details of construction further than is set out in the claims hereto. A pipe formed in this manner will be much stronger than the pipe ordinarily used, and it will be possible to form the straining openings easily and economically before the plates are placed in position and secured in place. It is believed that those skilled in the art will understand these advantages without further description.

What I claim as new and desire to protect by Letters Patent is:

1. A well strainer comprising a pipe having perforations therein, plates fitting longitudinally of said pipe and covering said perforations, said plates being grooved longitudinally on their under sides, and having spaced groups of slotted openings therethrough adapted to allow the passage of fluid to said perforations.

2. A well strainer comprising a pipe having perforations therein, plates curved to fit the outer surface of said pipe and cover said perforations, said plates being grooved on their under sides and formed with straining slots parallel with and cutting the troughs of said grooves, each slot cutting a separate groove.

3. A well strainer comprising a pipe having spaced openings therein, a series of plates extending longitudinally of said pipe with the inner surface thereof contacting with said pipe, and covering said openings, said plates being grooved longitudinally on their inner faces, and formed with groups of slots therein, said slots being cut longitudinally to connect with the troughs of said grooves, and means to secure said plates to said pipe and close the ends of said grooves.

4. A well strainer comprising a pipe having regularly spaced openings therein, longitudinal plates transversely curved to fit said pipe and having straining slots therein, means to secure said plates to said pipe, said plates being formed on their inner faces to provide a plurality of fluid conducting passages connecting said openings between said plates and said pipe.

5. A well strainer comprising a pipe having regularly spaced openings therein, longitudinal plates transversely curved to fit said pipe, and having straining slots therein, means to secure said plates to said pipe, said plates being formed with a plurality of longitudinal grooves on their inner faces to provide fluid passages between said plates and said pipe.

In testimony whereof I hereunto affix my signature this 22nd day of July, A. D. 1930.

JOSEPH HENRY McEVOY, Jr.